United States Patent
Miyake

(10) Patent No.: US 12,050,107 B2
(45) Date of Patent: Jul. 30, 2024

(54) GUIDANCE SENTENCE GENERATION APPARATUS, GUIDANCE SENTENCE GENERATION SYSTEM, GUIDANCE SENTENCE GENERATION METHOD AND PROGRAM

(71) Applicant: NIPPON TELEGRAPH AND TELEPHONE CORPORATION, Tokyo (JP)

(72) Inventor: Asuka Miyake, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 70 days.

(21) Appl. No.: 17/774,911

(22) PCT Filed: Nov. 7, 2019

(86) PCT No.: PCT/JP2019/043702
§ 371 (c)(1),
(2) Date: May 6, 2022

(87) PCT Pub. No.: WO2021/090445
PCT Pub. Date: May 14, 2021

(65) Prior Publication Data
US 2022/0412744 A1 Dec. 29, 2022

(51) Int. Cl.
*G06F 40/40* (2020.01)
*G01C 21/20* (2006.01)
*G06F 40/56* (2020.01)

(52) U.S. Cl.
CPC ........... *G01C 21/206* (2013.01); *G06F 40/56* (2020.01); *G06F 40/40* (2020.01)

(58) Field of Classification Search
CPC ....... G01C 21/206; G06F 40/40; G06F 40/56; G06Q 50/10
See application file for complete search history.

(56) References Cited

U.S. PATENT DOCUMENTS

| | | | | |
|---|---|---|---|---|
| 2010/0241350 A1* | 9/2010 | Cioffi | ................ | G01C 21/3629 704/E21.001 |
| 2014/0379251 A1* | 12/2014 | Tolstedt | ............... | G01C 21/206 701/410 |
| 2015/0330787 A1* | 11/2015 | Cioffi | .................... | G01C 21/20 701/538 |

FOREIGN PATENT DOCUMENTS

| | | |
|---|---|---|
| JP | 2001128149 A | 5/2001 |
| JP | 2017026537 A | 2/2017 |

OTHER PUBLICATIONS

IBM Japan, Ltd. (2017) "Voice navigation system that guides indoors and outdoors without distinction" IBM Smarter Business [online] website: https://www.ibm.com/blogs/smarter-business/business/navcog/.

* cited by examiner

*Primary Examiner* — Dale Moyer

(57) ABSTRACT

A guide sentence generation device includes an acquisition unit that acquires, from a storage unit, staircase information about a staircase existing on a path on which a user moves; and a generation unit that generates a guide sentence for walking on the staircase and a guide sentence for walking after going up or down the staircase based on the staircase information and the path.

20 Claims, 9 Drawing Sheets

Fig. 5

| STAIRCASE NAME | STAIRCASE TYPE | INSTALLATION FLOOR | LANDING OR TURN | NUMBER OF LANDINGS OR TURNS | TURN DIRECTION | TURN ANGLE | ROTATION DIRECTION | NUMBER OF STEPS |
|---|---|---|---|---|---|---|---|---|
| UNDERGROUND HALL | L-SHAPED | FIRST BASEMENT FLOOR, FIRST FLOOR | LANDING | 2 | STRAIGHT, TO LEFT | 0 DEGREES, 90 DEGREES | — | 15, 9, 13 |
| CAFETERIA | U-SHAPED | FIRST FLOOR, SECOND FLOOR | LANDING | 1 | TO RIGHT | 180 DEGREES | — | 11, 11 |
| EMERGENCY STAIRS | SPIRAL | FIRST FLOOR, THIRD FLOOR | — | — | — | — | CLOCKWISE | 28 |
| ... | ... | ... | ... | ... | ... | ... | ... | ... |

Fig. 6
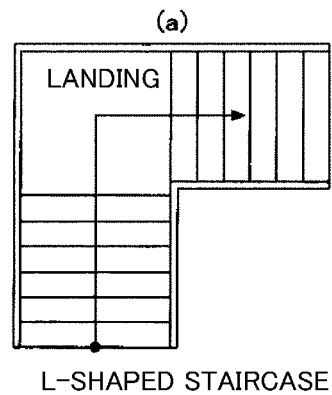
L-SHAPED STAIRCASE
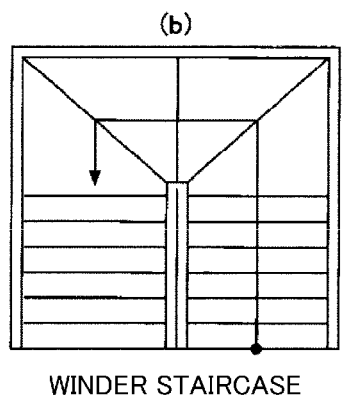
WINDER STAIRCASE
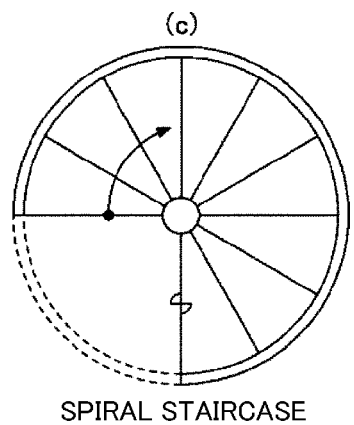
SPIRAL STAIRCASE

Fig. 7

| ROUTE NAME | STAIRCASE TYPE | STAIRCASE POSITION | UP OR DOWN | DESTINATION FLOOR | LANDING OR TURN | NUMBER OF LANDINGS OR TURNS | TURN DIRECTION | TURN ANGLE | ROTATION DIRECTION | NUMBER OF STEPS | DIRECTION TO GO AFTER GOING UP OR DOWN |
|---|---|---|---|---|---|---|---|---|---|---|---|
| UNDERGROUND HALL UP | L-SHAPED | STRAIGHT | UP | FIRST FLOOR | LANDING | 2 | STRAIGHT, TO LEFT | 0 DEGREES, 90 DEGREES | — | IRREGULAR | STRAIGHT |
| EMERGENCY STAIRS DOWN | SPIRAL | RIGHT | DOWN | FIRST FLOOR | — | — | — | — | CLOCKWISE | REGULAR | TO RIGHT |

Fig. 8

OUTPUT EXAMPLE OF UNDERGROUND HALL UP ROUTE (OUTLINE OF STAIRCASE) NOW GO UP STAIRCASE IN STRAIGHT DIRECTION.

(DETAILS OF STAIRCASE COMPOSED OF SETS OF STRAIGHT STAIRS) THE NUMBER OF LANDINGS IS TWO; AT THE FIRST, GO STRAIGHT AND AT THE SECOND, TURN TO LEFT. THE NUMBER OF STEPS IS IRREGULAR.

(AFTER GOING UP OR DOWN) GO UP TO THE FIRST FLOOR AND THEN GO STRAIGHT.

Fig. 9

OUTPUT EXAMPLE OF EMERGENCY STAIRS DOWN ROUTE (OUTLINE OF STAIRCASE) NOW GO DOWN SPIRAL STAIRCASE IN RIGHT DIRECTION.

(DETAILS OF CURVED STAIRCASE) CLOCKWISE.

(AFTER GOING UP OR DOWN) GO DOWN TO THE FIRST FLOOR AND THEN GO TO RIGHT.

GUIDANCE SENTENCE GENERATION APPARATUS, GUIDANCE SENTENCE GENERATION SYSTEM, GUIDANCE SENTENCE GENERATION METHOD AND PROGRAM

CROSS-REFERENCE TO RELATED APPLICATIONS

This application is a U.S. National Stage Application filed under 35 U.S.C. § 371 claiming priority to International Patent Application No. PCT/JP2019/043702, filed on 7 Nov. 2019, the disclosure of which is hereby incorporated herein by reference in its entirety.

TECHNICAL FIELD

The present invention relates to a technique for generating a guide sentence for supporting walking of a visually impaired person or the like.

BACKGROUND ART

In order for visually impaired persons to walk indoors and outdoors and reach their destinations, in general, they need to accompany a sighted person or to be cared for by, for example, a guide dog. Special care should be taken when visually impaired persons go up and down stairs.

In recent years, a guidance system has been provided that supports walking of a visually impaired person by using a terminal such as a smartphone that can acquire location information. For example, in PTL 1, a system is disclosed in which a visually impaired person carries a video shooter such as a camcorder and a voice communication terminal, and a caregiver who is always present in a service center provides voice guidance based on video, voice, and location information transmitted from the visually impaired person.

Further, NPL 1 discloses a guidance system that provides voice guidance in real time to a visually impaired person using a smartphone.

CITATION LIST

Patent Literature

[PTL 1] Japanese Patent Application Publication No. 2001-128149

Non Patent Literature

[NPL 1] "Okunaigai wo kubetu naku annaisuru onsei navigation system (Voice navigation system for guidance regardless of whether indoors or outdoors)", retrieved on Oct. 25, 2019 from Internet <URL: https://www.cs.cmu.edu/~NavCog/navcog.html>

SUMMARY OF THE INVENTION

Technical Problem

However, such a conventional guidance system has a problem that it is not possible to provide appropriate guidance for a visually impaired person going up and down stairs.

For example, in the technique disclosed in PTL 1, a caregiver in a remote place acts as visually impaired person's eyes to provide directions, but information on a visible range through a camcorder is limited, and thus the caregiver can recognize the presence of stairs, while cannot recognize what kind of stairs it is. Therefore, the caregiver cannot inform the visually impaired person in advance of guidance for walking on the stairs and guidance for which direction to go after going up or down the stairs.

Further, for example, the technique disclosed in NPL 1 can only guide a visually impaired person to the position of the stairs and whether to go up or down when the visually impaired person approaches the start point of the stairs.

The present invention has been made in view of the foregoing, and an object of the present invention is to provide a technique capable of generating appropriate guidance for a user such as a visually impaired person walking on stairs.

Means for Solving the Problem

According to the technique disclosed herein, a guide sentence generation device is provided including an acquisition unit that acquires, from a storage unit, staircase information about a staircase existing on a path on which a user moves; and a generation unit that generates a guide sentence for walking on the staircase and a guide sentence for walking after going up or down the staircase based on the staircase information and the path.

Effects of the Invention

According to the disclosed technique, a technique is provided that is capable of generating appropriate guidance for a user such as a visually impaired person walking on stairs.

BRIEF DESCRIPTION OF DRAWINGS

FIG. 5 illustrates examples of staircase information.

FIG. 6 illustrates examples of types of staircases.

FIG. 7 illustrates examples of generated inter-floor moving routes.

FIG. 8 illustrates an output example of an underground-hall up route.

FIG. 9 illustrates an output example of an emergency-stairs down route.

DESCRIPTION OF EMBODIMENTS

Embodiments of the present invention will be described below with reference to the drawings. The embodiments described below are merely examples, and embodiments to which the present invention is applied are not limited to the following embodiments.

The following description assumes that the "user" is a visually impaired person, but is not limited to that. A person who is not visually impaired may use the guide sentence generation device according to the present invention.

Device Configuration

Figure 1:
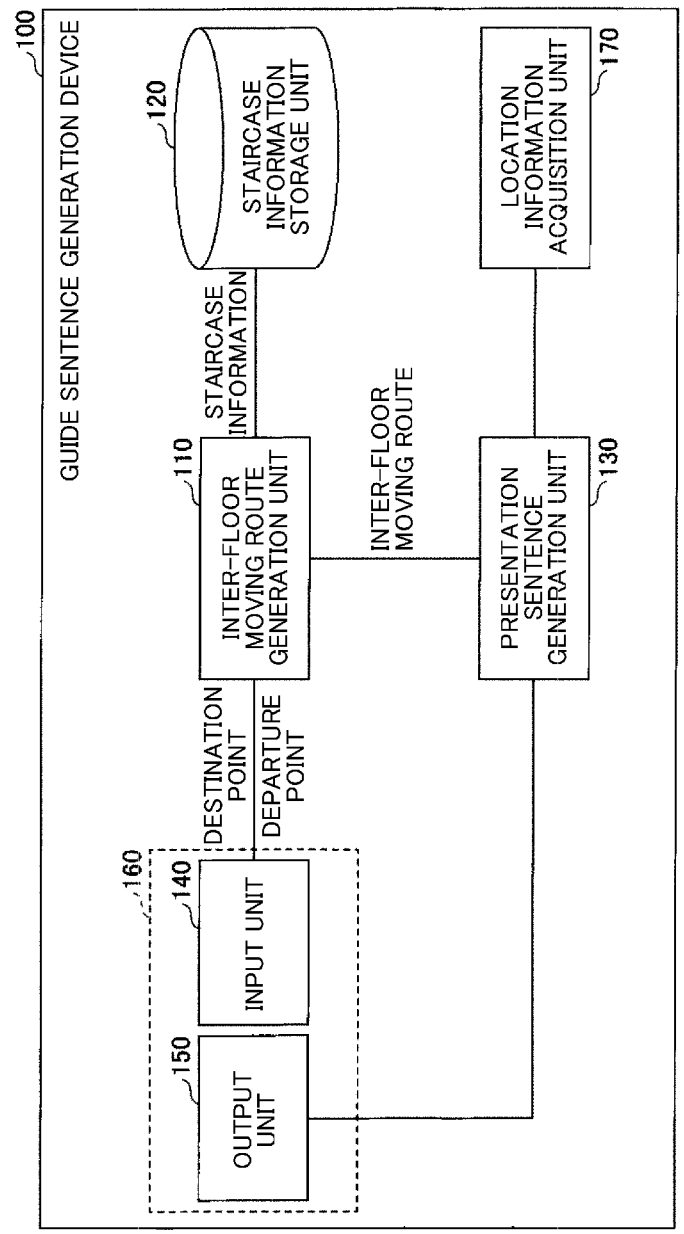
FIG. 1 is a block diagram of a guide sentence generation device.

FIG. 1 is a configuration diagram of a guide sentence generation device 100 according to an embodiment of the present invention. As illustrated in FIG. 1, the guide sentence generation device 100 includes an inter-floor moving route generation unit 110, a staircase information storage unit 120, a presentation sentence generation unit 130, an input unit 140, an output unit 150, and a location information acquisition unit 170.

Note that, in an example described here, the guide sentence generation device 100 has a guide sentence generation function for inter-floor movement according to the present invention, and additionally includes the location information acquisition unit 170 that acquires its own current location. Further, it is assumed that the presentation sentence generation unit 130 has a function of navigating the user based on the current location. Note that the navigation function itself is an existing technique as disclosed in NPL 1, for example.

However, it is not essential that the guide sentence generation device 100 incudes the location information acquisition unit and/or the navigation function. The guide sentence generation device 100 may have only a function of generating a guide sentence for inter-floor movement. In this case, for example, a guide sentence generated by the guide sentence generation device 100 is supplies to a navigation system provided separately from the guide sentence generation device 100. Further, in this case, for example, the user confirms the guide sentence generated by the guide sentence generation device 100 in advance before walking to grasp the inter-floor moving route in advance.

The guide sentence generation device 100 may be a single device or a system including a plurality of devices. In a case where the guide sentence generation device 100 is a system including a plurality of devices, the guide sentence generation device 100 may be referred to as a guide sentence generation system 100.

Case where the Guide Sentence Generation Device 100 is a Single Device

In a case where the guide sentence generation device 100 is a single device, the guide sentence generation device 100 is, for example, a smartphone, a tablet, or the like, which is held by the user, and the user can receive the presentation of a guide sentence by the guide sentence generation device 100 during walking. In this case, the input unit 140 and the output unit 150 are composed of, for example, a touch panel (character input and selection, image output), a microphone (voice input), a speaker (voice output), a camera (image input), and the like. The location information acquisition unit 170 is composed of a GPS receiver, a sensor, and the like included in the smartphone.

The outline of the operation of each unit of the guide sentence generation device 100 is as follows. Examples of staircase information and details of generating a guide sentence will be explained in detail with reference to flowcharts in the description of operation examples.

The input unit 140 receives a departure point and a destination point through character or voice input, and passes information on the departure point and destination point and an instruction to generate an inter-floor moving route to the inter-floor moving route generation unit 110.

The inter-floor moving route generation unit 110 receives the information on the departure point and destination point as an input, and outputs information on a path, staircase information, and an inter-floor moving route for each staircase. The inter-floor moving route generation unit 110 calculates a path from the departure point to the destination point by referring to, for example, a map information database on a network (or included in the guide sentence generation device 100). The information on the calculated path includes the location of one or more staircases and the staircase name of their respective staircases. Note that the map information database referred to here also includes information on the inside of a building, and the path can be calculated even if the departure point and destination point are inside the building.

The inter-floor moving route generation unit 110 acquires, from the staircase information storage unit 120, staircase information for each staircase on the path on which the user moves. Then, the inter-floor moving route generation unit 110 generates, based on the acquired staircase information and the information on the path on which the user moves, the path from the departure point to the destination point, that is, an inter-floor moving route for each staircase on the path on which the user moves, and passes the inter-floor moving route for each staircase to the presentation sentence generation unit 130. At this time, the information on the path on which the user moves is also passed to the presentation sentence generation unit 130. Further, the location information acquisition unit 170 passes information on the current location to the presentation sentence generation unit 130.

Note that the staircase information storage unit 120 may be outside the guide sentence generation device 100. For example, the staircase information storage unit 120 may be a database server connected to the guide sentence generation device 100 via a network.

The presentation sentence generation unit 130 receives the information on the current location, the information on the path from the departure point to the destination point, and the inter-floor moving route for each staircase, as inputs and outputs a guide sentence. The output unit 140 receives the guide sentence as an input and outputs the guide sentence by voice or the like. Ina state where the user holds the guide sentence generation device 100 and has started walking, the presentation sentence generation unit 130 generates a guide sentence based on the information on the current location and the path from the departure point to the destination point, and passes the guide sentence to the output unit 140, so that the output 140 outputs the guide sentence by voice. Here, that guide sentence is, for example, a guide sentence such as "Go straight on this passage, and turn right at the end." This results in the provision of the navigation of the user.

In the present embodiment, in addition to the normal navigation as described above, the presentation sentence generation unit 130 generates a guide sentence about going up or down a staircase based on the inter-floor moving route passed from the inter-floor moving route generation unit 110. The generated guide sentence is passed to the output unit 140 to be output by voice. Note that the output being performed by voice is an example, and the guide sentence may be output by means other than voice. This guide sentence is intended to make it easier for the user to imagine the structure of a staircase for going up or down before the user actually goes up or down the staircase.

Further, for example, the input unit 130 may always wait to receive a guidance end command, and in response to the input of the guidance end command, the presentation sentence generation unit 130 may immediately end the processing of the guide sentence generation device 100.

Note that, in a case where the guide sentence generation device 100 is a single device, the guide sentence generation device 100 may be a stationary PC that is not supposed to be carried around. In this case, for example, the user can be presented with a guide sentence in advance to grasp what kind of structure the staircase for going up or down has.

Case where the Guide Sentence Generation Device 100 is a System Including a Plurality of Devices In a case where the guide sentence generation device 100 is a system including a plurality of devices, for example, a terminal 160 including the input unit 140 and the output unit 150 is a smartphone, a tablet, or the like, which is held by the user. Further, a device including the inter-floor moving route generation unit 110, the staircase information storage unit 120, and the presentation sentence generation unit 130 is a server connected to the terminal 160 via a network. In this case, the location information acquisition unit 170 is included in the terminal 160, and the acquired location information is notified to the server.

In this case, the server may be referred to as the guide sentence generation device or the guide sentence generation system. The user can receive the presentation of a guide sentence from the terminal 160 during walking, for example. The operation of each unit is the same as the operation described above.

Hardware Configuration Example

The guide sentence generation device (including the above server) can be realized, for example, by a computer when executing a program describing the processing contents described in the present embodiment. Note that, in a case of using the above server, the "computer" may be a virtual machine on the cloud. In a case of using a virtual machine, the "hardware" described herein is virtual hardware.

The guide sentence generation device can be realized by a program being executed corresponding to the processing executed by the guide sentence generation device using hardware resources such as a CPU and a memory built in the computer. The above program can be stored and distributed as being recorded on a computer-readable recording medium (portable memory, etc.). The above program can also be provided through a network such as the Internet or e-mail.

Figure 2:
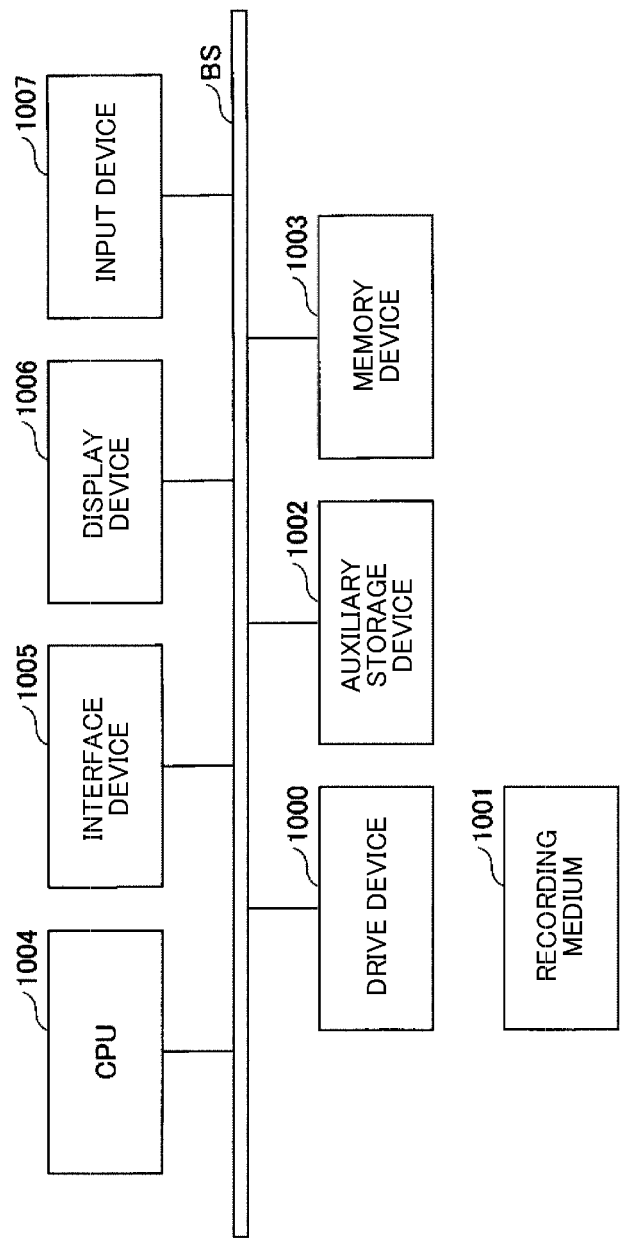
FIG. 2 is a hardware configuration diagram of the device.

FIG. 2 is a diagram illustrating a hardware configuration example of the above-mentioned computer. The computer of FIG. 2 includes a drive device 1000, an auxiliary storage device 1002, a memory device 1003, a CPU 1004, an interface device 1005, a display device 1006, an input device 1007, and the like, which are connected to each other by a bus B.

The program for implementing the processing in the computer is provided by, for example, a recording medium 1001 such as a CD-ROM or a memory card. When the recording medium 1001 storing the program is set in the drive device 1000, the program is installed in the auxiliary storage device 1002 from the recording medium 1001 via the drive device 1000. However, the program does not necessarily have to be installed from the recording medium 1001, and may be downloaded from another computer via a network. The auxiliary storage device 1002 stores the installed program and also stores necessary files, data, and the like.

In response to an instruction to start a program, the memory device 1003 reads the program from the auxiliary storage device 1002 and stores the program. The CPU 1004 implements functions related to the guide sentence generation device 100 in accordance with the program stored in the memory device 1003. The interface device 1005 is used as an interface for connecting to the network. The display device 1006 displays a GUI (Graphical User Interface) or the like in accordance with the program. The input device 1007 is composed of a keyboard, a mouse, buttons, a touch panel, and the like, and is used for inputting various operation instructions.

Operation Example of Guide Sentence Generation Device 100

Figure 3:
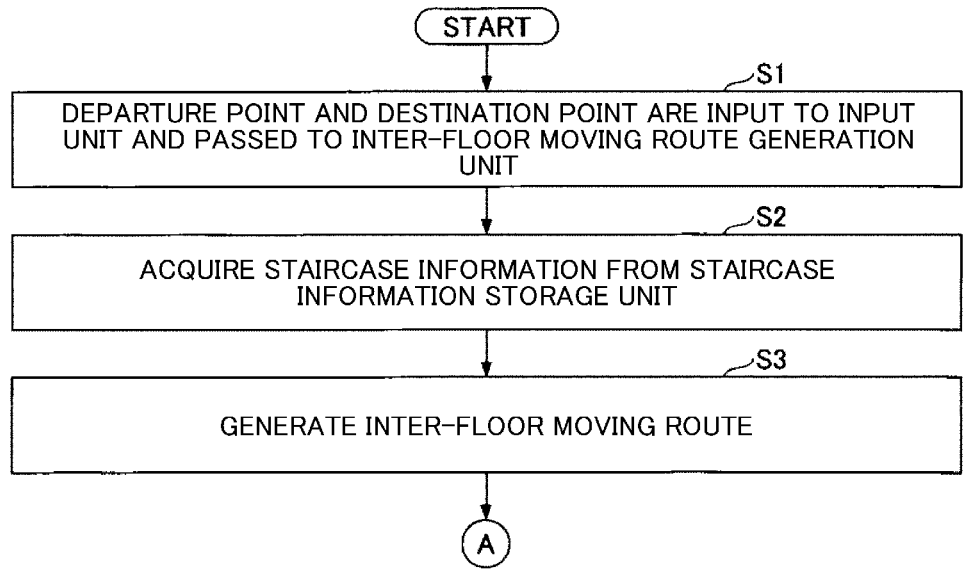
FIG. 3 is a flowchart of processing of the guide sentence generation device.

Hereinafter, an operation example of the guide sentence generation device 100 will be described according to the procedure of flowcharts of FIGS. 3 and 4. In the following example, a case where the guide sentence generation device 100 is a smartphone or the like will be described. Even in a case where the guide sentence generation device 100 includes the terminal 160 and the server, the operation of each unit is the same as the corresponding operation described below.

In step S1, the input unit 140 receives the inputs of the names of a departure point and a destination point, and passes the received information to the inter-floor moving route generation unit 110. More specifically, the input unit 140 notifies the inter-floor moving route generation unit 110 of an instruction to generate an inter-floor moving route that is a route of staircase for inter-floor movement, which passes from the departure point to arrival at the destination point. That instruction includes text information of the names of the departure point and destination point. Note that the text information of the name of the departure point is described as "departure point", and the text information of the name of the destination point is described as "destination point".

The input method to the input unit 140 may be character input and/or selective input through keyboard operation, touch operation, and the like, may be voice input (converts the input voice into text information by voice recognition), or may be any other input method.

In step S2, the inter-floor moving route generation unit 110 calculates a path from the departure point to the destination point based on the departure point and the destination point, and acquires staircase information for each staircase on the path from the staircase information storage unit 120.

FIG. 5 illustrates examples of the staircase information. As illustrated in FIG. 5, the staircase information includes staircase name, staircase type, installation floors, landing or turn, the number of landings or turns, turn direction, turn angle, rotation direction, and the number of steps.

The staircase name is the name of a staircase on the path on which the user moves. The type of staircase has a value that indicates a straight staircase, a U-shaped staircase, an L-shaped staircase, and the like. FIG. 6 illustrates examples of an L-shaped staircase (a), a winder staircase (b), and a spiral staircase (c). Note that the staircases illustrated in FIG. 6 are merely examples. Types other than those illustrated include, for example, a curved staircase and a U-shaped staircase.

The installation floors indicate floors across a corresponding staircase. For example, the installation floors of a staircase that for going up from the first basement floor to the first floor are the first basement floor and the first floor.

As illustrated in (a) of FIG. 6, the landing is a flat place located between steps of the staircase and longer than the depth of one step. As illustrated in (b) of FIG. 6, the turn is a place where the direction is changed while going up or down the steps at a place other than the landing.

The turn direction, turn angle, and rotation direction are those when the staircase is viewed from a reference direction. For example, as illustrated in (a) of FIG. 6, for a staircase having one landing and a structure that turns at the landing, when the up direction as viewed from the bottom of the staircase is a reference direction, the "turn direction" is right, and the "turn angle" is 90 degrees. Note that the reference direction is specified for each staircase, and any specification method may be used.

For example, in a case where there are two landings (a first landing and a second landing from the bottom), the number of steps indicates the number of steps from the beginning of the staircase to the first landing, the number of steps from the first landing to the second landing, and the number of steps from the second landing to the end of the staircase. In other words, the number of steps is for each of sets of stairs into which the staircase is divided by a landing (or a turn).

Note that the information illustrated in FIG. 5 (and information illustrated in FIG. 7) may be stored as text information or may be stored as values associated with the text information.

In step S3, the inter-floor moving route generation unit 110 generates, based on the information on the path and the staircase information, an inter-floor moving route for each staircase on the path on the user moves and passes the inter-floor moving route for each staircase to the presentation sentence generation unit 130. At this time, the information on the path on which the user moves is also passed to the presentation sentence generation unit 130. The passed inter-floor moving route for each staircase and the information on the path are stored in a storage means such as a memory in the presentation sentence generation unit 130.

FIG. 7 illustrates examples of the inter-floor moving route generated by the inter-floor moving route generation unit 110. The examples indicate the case where the staircase on a path is "underground hall" or "emergency stairs" and indicate that there are two inter-floor moving routes: "underground hall up" and "emergency stairs down". The information on the inter-floor moving route is used for generating a guide sentence, as will be described later.

Each inter-floor moving route includes route name, staircase type, staircase position, up or down, destination floor, landing or turn, the number of landings or turns, turn direction, turn angle, rotation direction, and direction to go after going up or down.

The staircase information is used as it is for the staircase type, landing or turn, and the number of landings or turns.

In terms of the staircase position and up or down, the inter-floor moving route generation unit 110 determines, based on the path on which the user moves, the position of the staircase when the user reaches the front of the staircase (whether the staircase is in the position of going straight or on the right side from the user's point of view, etc.) and whether the user is to go up or down the staircase. Further, when the up or down is determined, the destination floor can be determined from the installation floor included in the staircase information. The route name is generated by adding the result of determining the up or down to the staircase name included in the staircase information.

In terms of the turn direction, the turn angle, and the rotation direction, the staircase information can be used as it is if the direction based on the path on which the user moves is the same as the reference direction. If the direction based on the path on which the user moves is opposite to the reference direction, the direction included in the staircase information may be reversed.

For example, in terms of the "turn direction", assume that the "turn direction" of the staircase of underground hall included in the staircase information illustrated in FIG. 5 is a turn direction when the direction of going up the staircase is set as a reference direction. In this case, when an inter-floor moving route to be generated for that staircase indicates a downward direction, the turn direction included in the inter-floor moving route can be determined as the reverse of the turn direction included in the staircase information.

The "direction to go after going up or down" included in the inter-floor moving route can be determined from the information on the path on which the user moves. For example, in a case of going up the staircase, if the path after going up is to the right, the value of the "direction to go after going up or down" is "right".

In terms of the "number of steps" included in the inter-floor moving route, the inter-floor moving route generation unit 110 determines whether the "number of steps" included in the inter-floor moving route is regular or irregular based on the value of the "number of steps" included in the staircase information, and determines that the value of the "number of steps" included in the inter-floor moving route is set to the result of the determination.

More specifically, if the "number of steps" included in the staircase information has a plurality of values and there is at least one combination in which the difference between two of the values among a plurality of values is N or more (N is an integer of 1 or more), the inter-floor moving route generation unit 110 sets the value of the "number of steps" included in the inter-floor moving route to "irregular". Otherwise, the inter-floor moving route generation unit 110 sets the value of the "number of steps" included in the inter-floor moving route to "regular".

In the present embodiment, N is 5 in that determination. In this case, for example, for the staircase of underground hall illustrated in FIG. 5, since at least one combination in which the "number of steps" included in the staircase information has a plurality of values (3) and the difference between two of the values among a plurality of values is 5 or more (i.e., 15−9=6), the corresponding value included in the inter-floor moving route is "irregular".

As will be described later, in terms of the number of steps, if the number of steps indicates "irregular" rather than the number of steps itself, it is included in the guide sentence. The reason is that the user can determine that the user has arrived at the landing or the end point of the staircase by using a white cane without the information on the number of steps.

In addition, if the number of steps is not presented, the user (visually impaired person) generally images a regular staircase having sets of stairs into which the staircase is divided by a landing or the like so that each set has the same number of steps, and as a result, intends to go up or down such a staircase. Thus, when the number of steps in the staircase is different from the number of steps imagined by the user, the user feels uneasy.

Therefore, in the present embodiment, when the number of steps indicates "irregular", it is included in the guide sentence so that the structure of the staircase can be easily imagined. Note that the value of N may be any value of 1 or more.

As the presentation information indicating "irregular", "irregular" may be used as it is as described above, or an increase or decrease in the number of steps between sets of stairs into which the staircase is divided by a landing or a turn (increase by 5 steps, etc.) or the number of steps of each set of stairs itself (15, 9, 13, etc.) may be used.

An operation of generating a guide sentence for going up or down a staircase will be described with reference to a flowchart of FIG. 4, for a situation where the inter-floor moving route generation unit 110 passes the information on the inter-floor moving route and the path on which the user moves to the presentation sentence generation unit 130, and then the user has started walking with the guide sentence generation device 100.

Figure 4:
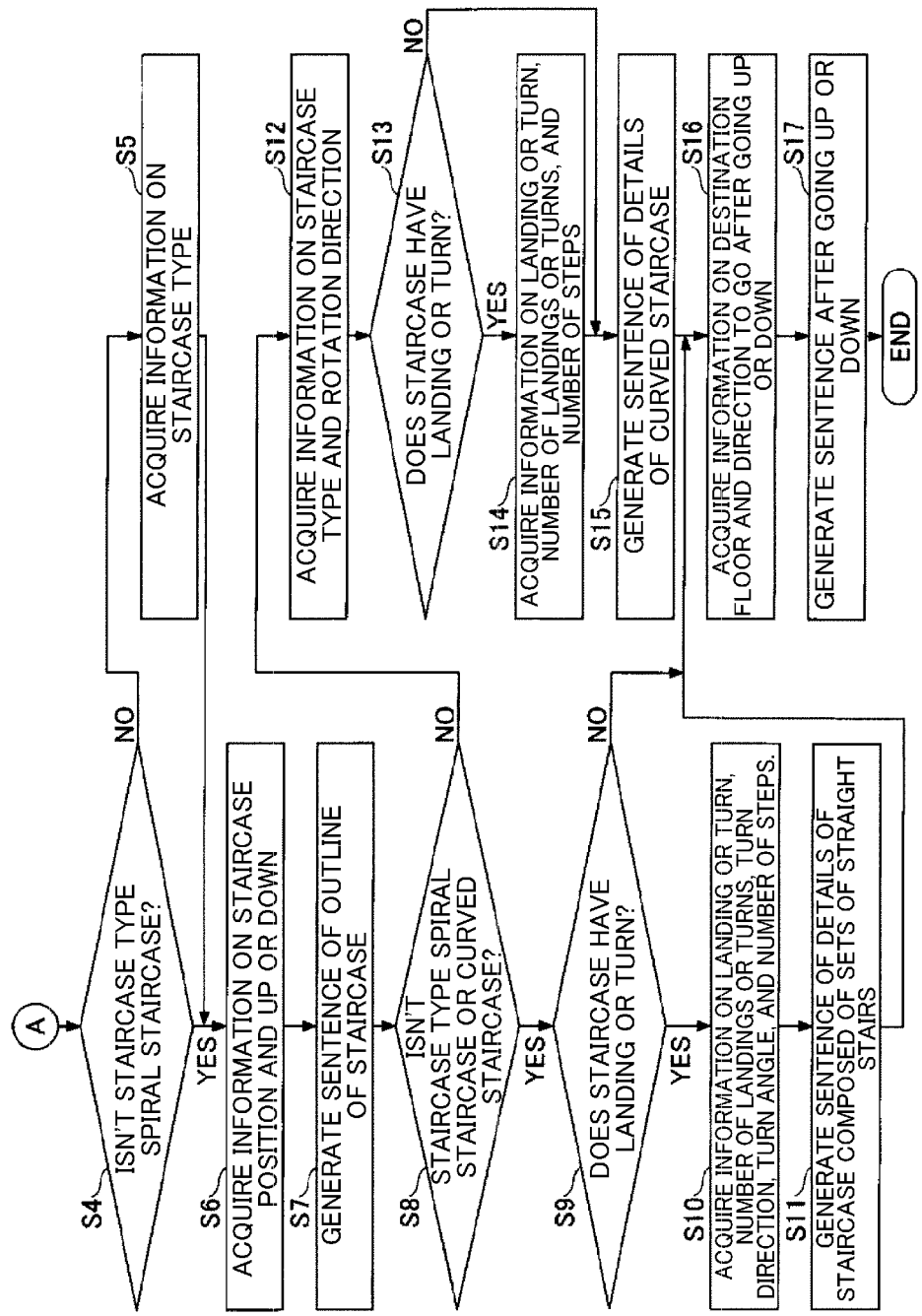
FIG. 4 is a flowchart of processing of the guide sentence generation device.

FIG. 4 illustrates, for example, processing for a certain staircase (referred to as a target staircase) before the user reaches the staircase included in an inter-floor moving route (e.g., when the user approaches the staircase within a predetermined distance). Alternatively, the processing of FIG. 4 for each inter-floor moving route on the path on which the user moves may be performed in advance, a guide sentence for each inter-floor moving route may be generated in advance and stored in a memory or the like, and a guide sentence corresponding to that staircase may be presented in front of the staircase.

In step S4, the presentation sentence generation unit 130 refers to the staircase type included in the inter-floor moving route for the target staircase to determine whether or not the staircase type is a spiral staircase. If the target staircase is a spiral staircase, the processing proceeds to step S5, and then the presentation sentence generation unit 130 acquires information on the staircase type. Then, the processing proceeds to step S6. If the target staircase is not a spiral staircase, the processing proceeds to step S6 without the presentation sentence generation unit 130 acquiring information of the staircase type.

As will be described later, the acquired staircase type (i.e., spiral staircase) is presented in a guide sentence. The reason why the information on the staircase type is acquired and presented only when the target staircase is a spiral staircase is that a spiral staircase makes it easy for the user (visually impaired person) to imagine its structure in words, and each step of a spiral staircase has an extremely narrow inner width, which requires the user to walk carefully. However, even if the target staircase is other than a spiral staircase, the staircase type may be presented.

In step S6, the presentation sentence generation unit 130 acquires the information on the staircase position and the up or down from the inter-floor moving route for the target staircase.

In step S7, the presentation sentence generation unit 130 generates a sentence or sentences of the outline of the staircase (a guide sentence or sentences of the outline about walking on the staircase) based on the information acquired so far.

In the first line in FIG. 8, an example of a sentence of the outline of the staircase for "underground hall up" as indicated in the inter-floor moving route of the target staircase is illustrated. Further, in the first line in FIG. 9, an example of a sentence of the outline of the staircase for "emergency stairs down" as indicated in the inter-floor moving route of the target staircase is illustrated. The sentence(s) of the outline of the staircase include, for example, information on the direction in which the staircase is located, the staircase type, and whether it is to go up or down to the destination floor.

Any method may be used as a method of generating a sentence or sentences based on the acquired information, but in the present embodiment, the sentence(s) are generated using a template. For example, the presentation sentence generation unit 130 stores, in a storage means such as a memory, a template for generating an outline sentence, such as "Now go [up or down] [staircase type] staircase in [staircase position] direction to [destination floor]." The presentation sentence generation unit 130 replaces the [ . . . ] parts in the template with the acquired information corresponding to the items in the [ . . . ] parts and generates a sentence. This makes it possible to generate a sentence such as "Now go up staircase in straight direction." or "Now go down spiral staircase in right direction."

In step S8, the presentation sentence generation unit 130 determines whether the staircase type included in the inter-floor moving route for the target staircase is neither a spiral staircase nor a curved staircase. If the determination in step S8 is Yes, that is, if the target staircase is neither a spiral staircase nor a curved staircase (in other words, it is a staircase composed of sets of straight stairs), the processing proceeds to step S9. If the target staircase is a spiral staircase or a curved staircase (in other words, it is a staircase composed of curved stairs), the processing proceeds to step S12.

In step S9, the presentation sentence generation unit 130 determines whether or not the target staircase has a landing or a turn based on the inter-floor moving route for the target staircase. If the target staircase has a landing or a turn, the processing proceeds to step S10. If the target staircase has no landing or turn, the processing proceeds to step S16 without generating a sentence of details of the staircase.

In step S10, the presentation sentence generation unit 130 acquires, from the information on the inter-floor moving route for the target staircase, the information on landing or turn, the number of landings or turns, turn direction, turn angle, and the number of steps.

In step S11, the presentation sentence generation unit 130 generates a sentence or sentences of details of the staircase composed of sets of straight stairs based on the information acquired in steps S9 and S10. The sentence(s) of details of the staircase include, for example, information about the number of landings or turns of the staircase, the turn direction, and the number of steps before and after the landing or the turn. In the second line in FIG. 8, for "underground hall up" as indicated in the inter-floor moving route of the target staircase, an example of a sentence of details of the staircase composed of sets of straight stairs is illustrated.

Any method may be used as a method of generating a sentence or sentences based on the acquired information, but in the present embodiment, the sentence(s) are generated using a template. For example, the presentation sentence generation unit 130 stores, in a storage means such as a memory, a template for generating sentences of details of a staircase composed of sets of straight stairs, such as "The number of [landing or turn] is [the number of landings or turns]; <at all (multiple landings or turns all having the same turn direction)/at the first . . . and at the second (multiple landings or turns all having different turn directions)/—(one landing or one turn)>, <turn (90 degrees) to/go (0 degrees)/make a U turn (180 degrees)>[turn direction]. <The number of steps is irregular (irregular)/—(regular)>."

Here, [ . . . ] indicates the acquired information corresponding to the term in [ . . . ], ( . . . ) indicates a condition for the inter-floor moving route, and < . . . > indicates a set of sentences according to the condition of ( . . . ). For example, <at all (multiple landings or turns all having the same turn directions)> indicates that the phrase "at all" is used for the case where there are a plurality of landings or turns and they all have the same turn directions in the inter-floor moving route. In addition, "–" means that no corresponding phrase is generated when the condition of ( . . . ) is satisfied.

With such a template, a sentence is generated such as "The number of landings is two; at the first, go straight and at the second, turn to left."

In step S12 to which the processing proceeds for the target staircase being a spiral staircase or a curved staircase, the presentation sentence generation unit 130 acquires information on the staircase type and rotation direction from the information on the inter-floor moving route for the target staircase. Note that a spiral staircase and a curved staircase are collectively referred to as a curved staircase.

In step S13, as in step S9, the presentation sentence generation unit 130 determines whether or not the target staircase has a landing or a turn. If it has a landing or a turn, the processing proceeds to step S14. If it has no landing or turn, the processing proceeds to step S15.

In step S14, the presentation sentence generation unit 130 acquires, from the information on the inter-floor moving route for the target staircase, the information on landing or turn, the number of landings or turns, turn direction, and the number of steps.

In step S15, the presentation sentence generation unit 130 generates a detailed sentence or detailed sentences about walking on the curved staircase based on the information acquired in steps S12 to S14. In the second line in FIG. 9, an example of a sentence of details of the curved staircase for "emergency stairs down" as indicated in the inter-floor moving route of the target staircase is illustrated.

Any method may be used as a method of generating a sentence or sentences based on the acquired information, but in the present embodiment, the sentence (s) are generated using a template. For example, the presentation sentence generation unit 130 stores, in a storage means such as a memory, a template for generating sentences of details of a curved staircase, such as "<The number of landings is [the number of landings or turns](one or more landings)/—(no landing)>[rotation direction]. <The number of steps is irregular (irregular)/—(regular)>." By using this template, if there is no landing or turn and step S14 is skipped, a sentence of "clockwise." is generated.

As described above, in the present embodiment, a sentence of details of walking on a staircase (examples: the second line in FIG. 8 and the second line in FIG. 9) does not present information on the number of steps of the staircase and the presence or absence of a handrail but instead, provides information on the number of landings or turns and the turn direction at a landing or a turn. The reason is as follows.

The reason for the number of steps is as described above. Again, the reason is that the user can determine that the user has arrived at the landing or the end point of the staircase by using a white cane without the information on the number of steps. Also, the reason why the presence or absence of a handrail is not presented is that the user can feel a handrail in his/her way.

On the other hand, the reason why the information on a landing or a turn is presented is as follows. If there is no information on a landing or a turn, the user may actually be at a landing when the user feels that the user has left the staircase. Alternatively, even when the user feels that the user is at a landing, the user may be unsure as to which way to go, resulting in step off during feeling of the way with a white cane.

However, in the sentence of details of walking on the staircase, information on the number of steps of staircase or the presence or absence of a handrail, or both may be presented.

In step S16, the presentation sentence generation unit 130 acquires information on the destination floor and the direction to go after going up or down from the information on the inter-floor moving route for the target staircase, and then the processing proceeds to step S17.

In step S17, the presentation sentence generation unit 130 generates a sentence after going up or down based on the information acquired in step S16.

In the third line in FIG. 8, an example of a sentence after going up or down the staircase for "underground hall up" as indicated in the inter-floor moving route of the target staircase is illustrated. Further, in the third line in FIG. 9, an example of a sentence after going up or down the staircase for "emergency stairs down" as indicated in the inter-floor moving route of the target staircase is illustrated.

Any method may be used as a method of generating a sentence or sentences based on the acquired information, but in the present embodiment, the sentence(s) are generated using a template. For example, the presentation sentence generation unit 130 stores, in a storage means such as a memory, a template for generating a sentence after going up or down a staircase, such as "Go [up or down] to [destination floor] and then <turn to (90 degrees)/go (0 degrees)>[direction to go after going up or down]>." This makes it possible to generate a sentence such as "Go up to the first floor and then go straight." or "Go down to the first floor and then go to right."

The sentences generated by the above procedure (a guide sentence of the outline of walking on a staircase, a guide sentence of details of walking on the staircase, a guide sentence after going up or down) are transmitted from the presentation sentence generation unit 130 to the output unit 150 immediately before the user arrives at the target staircase, for example, and then output by voice from the output unit 150.

Their outputs are made in the order of the guide sentence of the outline of walking on a staircase, the guide sentence of details of walking on the staircase, and the guide sentence after going up or down. Note that the guide sentence of the outline of walking on a staircase may be output at the time when it is generated, the guide sentence of details of walking on the staircase may be output at the time when it is generated, and the guide sentence after going up or down may be output at the time when it is generated.

The reason why the sentence after going up or down is presented before going up or down the target staircase is that if the user does not know in advance the direction to go after going up or down the target staircase, the user has no choice but to stop at the end of the staircase until information on guidance for the next route is presented, which may collide with other pedestrians.

However, the sentence after going up or down being presented before going up or down the target staircase is merely an example. The sentence after going up or down may be presented on the way of going up or down the target staircase, or may be presented immediately after having gone up or down the target staircase.

Further, as a guide sentence, not all but part of (only one of or only two of) the sentence of the outline of walking on the staircase, the sentence of details of walking on the staircase, and the sentence after going up or down may be presented. Further, the sentence of the outline of walking on the staircase and the sentence of details of walking on the staircase may be put together without distinction.

Advantageous Effects of Embodiment and Summary

The technique according to the embodiment described above makes it possible to generate appropriate guidance when a user such as a visually impaired person walks on stairs.

More specifically, when the user goes up or down a staircase, a guide sentence that makes it easy for the user to imagine the structure of the staircase can be generated in advance, and by presenting the guide sentence, the user can move safely.

The present embodiment provides a guide sentence generation device, a guide sentence generation system, a guide sentence generation method, and a program at least as defined in the following items. Note that the inter-floor moving route generation unit 110 described in the embodiment is an example of an acquisition unit. The inter-floor moving route generation unit 110 and the presentation sentence generation unit 130 described in the embodiment are examples of a generation unit.

Item 1

A guide sentence generation device including:
an acquisition unit that acquires, from a storage unit, staircase information about a staircase existing on a path on which a user moves; and
a generation unit that generates a guide sentence for walking on the staircase and a guide sentence for walking after going up or down the staircase based on the staircase information and the path.

Item 2

The guide sentence generation device according to item 1, wherein the guide sentence for walking on the staircase indicates, only when the staircase is a spiral staircase, that the staircase to walk is a spiral staircase, and does not indicate, when the staircase is not a spiral staircase, a type of the staircase to walk.

Item 3

The guide sentence generation device according to item 1 or item 2, wherein the guide sentence for walking on the staircase indicates, only when the staircase is a spiral staircase, that a rotation direction, and indicates, when the staircase is not a spiral staircase, the number of landings or turns and a walking direction at each landing or turn.

Item 4

The guide sentence generation device according to any one of items 1 to 3, wherein the guide sentence for walking on the staircase indicates the information, when the staircase is not a spiral staircase and when the numbers of steps of a plurality of sets of stairs into which the staircase is divided by a landing or a turn are irregular, that the number of steps is irregular.

Item 5

The guide sentence generation device according to any one of items 1 to 4, wherein
the guide sentence for walking on the staircase includes a guide sentence of an outline of walking on the staircase and a guide sentence of details of walking on the staircase,
the outline of walking on the staircase includes information on a direction in which the staircase is located, a staircase type, and whether the staircase is to go up or down to a destination floor, and
the details of the staircase include information about the number of landings or turns of the staircase, a turn direction, and the number of steps before and after a landing or a turn.

Item 6

A guide sentence generation system including:
an acquisition unit that acquires, from a storage unit, staircase information about a staircase existing on a path on which a user moves; and
a generation unit that generates a guide sentence for walking on the staircase and a guide sentence for walking after going up or down the staircase based on the staircase information.

Item 7

A guide sentence generation method performed by a guide sentence generation device, the guide sentence generation method including:
an acquisition step of acquiring, from a storage unit, staircase information about a staircase existing on a path on which a user moves; and
a generation step of generating a guide sentence for walking on the staircase and a guide sentence for walking after going up or down the staircase based on the staircase information and the path.

Item 8

A program for causing a computer to function as the units of the guide sentence generation device according to any one of items 1 to 5.

Although the present embodiment has been described above, the present invention is not limited to such a specific embodiment, and various modifications and changes are possible within the scope and spirit of the present invention defined in the claims.

Reference Signs List

100 Guide sentence generation device
110 Inter-floor moving route generation unit
120 Staircase information storage unit
130 Presentation sentence generation unit
140 Input unit
150 Output unit
160 Terminal
170 Location information acquisition unit
1000 Drive device
1001 Recording medium
1002 Auxiliary storage device
1003 Memory device
1004 CPU
1005 Interface device
1006 Display device
1007 Input device

The invention claimed is:
1. A guide sentence generation device comprising a processor configured to execute a method comprising:
acquiring, from a storage, staircase information about a staircase existing on a path on which a user moves;
generating a first guide sentence for walking on the staircase and a second guide sentence for walking after going up or down the staircase based on the staircase information and the path, wherein the staircase includes a curved staircase; and causing guiding the user who is visually impaired walk on the staircase on the path according to the first guide sentence and continue walking according to the second guide sentence.

2. The guide sentence generation device according to claim 1, wherein the first guide sentence for walking on the staircase indicates, only when the staircase is a spiral staircase, that the staircase to walk is a spiral staircase, and does not indicate, when the staircase is not a spiral staircase, a type of the staircase to walk.

3. The guide sentence generation device according to claim 2, wherein, when the staircase is a spiral staircase, the first guide sentence for walking on the staircase indicates a rotation direction, and wherein, when the staircase is not a spiral staircase, the first guide sentence indicates a number of landings or turns and a walking direction at each landing or turn.

4. The guide sentence generation device according to claim 1; wherein the first guide sentence for walking on the staircase indicates, only when the staircase is a spiral staircase, that a rotation direction, and indicates, when the staircase is not a spiral staircase, a number of landings or turns and a walking direction at each landing or turn.

5. The guide sentence generation device according to claim 1, wherein the first guide sentence for walking on the staircase indicates the information, when the staircase is not a spiral staircase and when a numbers of steps of a plurality of sets of stairs into which the staircase is divided by a landing and a turn are irregular, that the number of steps is irregular.

6. The guide sentence generation device according to claim 1, wherein
the first guide sentence for walking on the staircase includes a third guide sentence indicating an outline of walking on the staircase and a fourth guide sentence indicating details of walking on the staircase,
the outline of walking on the staircase includes information on a direction in which the staircase is located, a staircase type, and whether the staircase is to go up or down to a destination floor, and
the details of the staircase include information about a number of landings or turns of the staircase, a turn direction, and a number of steps before and after a landing or a turn.

7. The guide sentence generation device according to claim 1, wherein the user is visually impaired, wherein the second guide sentence indicates whether to walk straight or turn toward a direction after going up or down the staircase.

8. The guide sentence generation device according to claim 1, wherein the staircase information at least includes one of:
a number of landings,
a number of turns of the staircase,
a turn direction, or
a number of steps before and after a landing or a turn.

9. The guide sentence generation device according to claim 1, the first guide sentence proceeding the second guide sentence.

10. A system for generating a guide sentence, the system comprising:
a processor: and
a memory storing computer-executable instructions that when executed by the processor cause the system to execute a method comprising:
acquiring, from a storage, staircase information about a staircase existing on a path on which a user moves;
generating a first guide sentence for walking on the staircase and a second guide sentence for walking after going up or down the staircase based on the staircase information, wherein the stair case includes a curved staircase; and
causing guiding the user who is visually impaired walk on the staircase on the path according to the first guide sentence and continue walking according to the second guide sentence.

11. The system according to claim 10, wherein the first guide sentence for walking on the staircase indicates, only when the staircase is a spiral staircase, that the staircase to walk is a spiral staircase, and does not indicate, when the staircase is not a spiral staircase, a type of the staircase to walk.

12. The system according to claim 10, wherein the first guide sentence for walking on the staircase indicates, only when the staircase is a spiral staircase, that a rotation direction, and indicates, when the staircase is not a spiral staircase, a number of landings or turns and a walking direction at each landing or turn.

13. The system according to claim 10, wherein the first guide sentence for walking on the staircase indicates the information, when the staircase is not a spiral staircase and when a numbers of steps of a plurality of sets of stairs into which the staircase is divided by a landing and a turn are irregular, that the number of steps is irregular.

14. The system according to claim 10, wherein
the first guide sentence for walking on the staircase includes a third guide sentence indicating an outline of walking on the staircase and a fourth guide sentence indicating details of walking on the staircase,
the outline of walking on the staircase includes information on a direction in which the staircase is located, a staircase type, and whether the staircase is to go up or down to a destination floor, and
the details of the staircase include information about a number of landings or turns of the staircase, a turn direction, and a number of steps before and after a landing or a turn.

15. The system according to claim 10, wherein
wherein the user is visually impaired, wherein the second guide sentence indicates whether to walk straight or turn toward a direction after going up or down the staircase.

16. A computer-implemented method for generating a guide sentence, the method comprising:
acquiring, from a storage, staircase information about a staircase existing on a path on which a user moves;
generating the guide sentence for walking on the staircase and a second guide sentence for walking after going up or down the staircase based on the staircase information and the path, wherein the staircase includes a spiral staircase; and
causing guiding the user who is visually impaired walk on the spiral staircase on the path according to the first guide sentence and continue walking according to the second guide sentence.

17. The computer-implemented method according to claim 16, wherein, when the staircase is a spiral staircase, the first guide sentence for walking on the staircase indicates a rotation direction, and wherein, when the staircase is not a spiral staircase, the first guide sentence indicates a number of landings or turns and a walking direction at each landing or turn.

18. The computer-implemented method according to claim 16, wherein the first guide sentence for walking on the staircase indicates, only when the staircase is a spiral staircase, that the staircase to walk is a spiral staircase, and does not indicate, when the staircase is not a spiral staircase, a type of the staircase to walk.

19. The computer-implemented method according to claim 16,
wherein the first guide sentence for walking on the staircase indicates, only when the staircase is a spiral staircase, that a rotation direction, and indicates, when the staircase is not a spiral staircase, a number of landings or turns and a walking direction at each landing or turn, and
wherein the first guide sentence for walking on the staircase indicates the information, when the staircase is not a spiral staircase and when a numbers of steps of a plurality of sets of stairs into which the staircase is divided by a landing and a turn are irregular, that the number of steps is irregular.

20. The computer-implemented method according to claim 16,
the first guide sentence for walking on the staircase includes a third guide sentence indicating an outline of walking on the staircase and a fourth guide sentence indicating details of walking on the staircase,
the outline of walking on the staircase includes information on a direction in which the staircase is located, a staircase type, and whether the staircase is to go up or down to a destination floor, and
the details of the staircase include information about a number of landings or turns of the staircase, a turn direction, and a number of steps before and after a landing or a turn.

* * * * *